March 15, 1932.　　A. M. McGREGOR　　1,850,024
TRACTION WHEEL LUG
Filed Aug. 24, 1929　　2 Sheets-Sheet 1
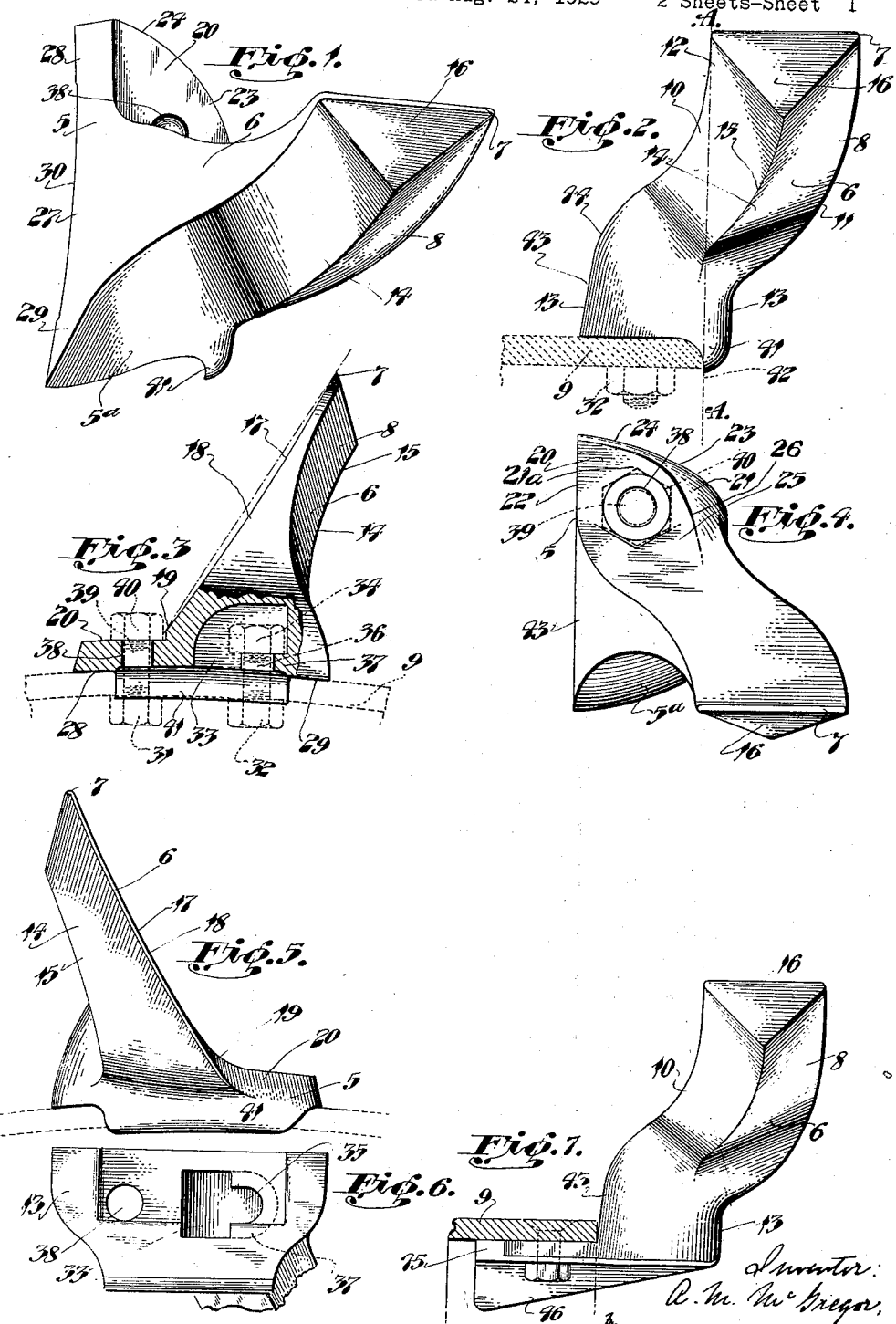

March 15, 1932. A. M. McGREGOR 1,850,024
TRACTION WHEEL LUG
Filed Aug. 24, 1929 2 Sheets-Sheet 2
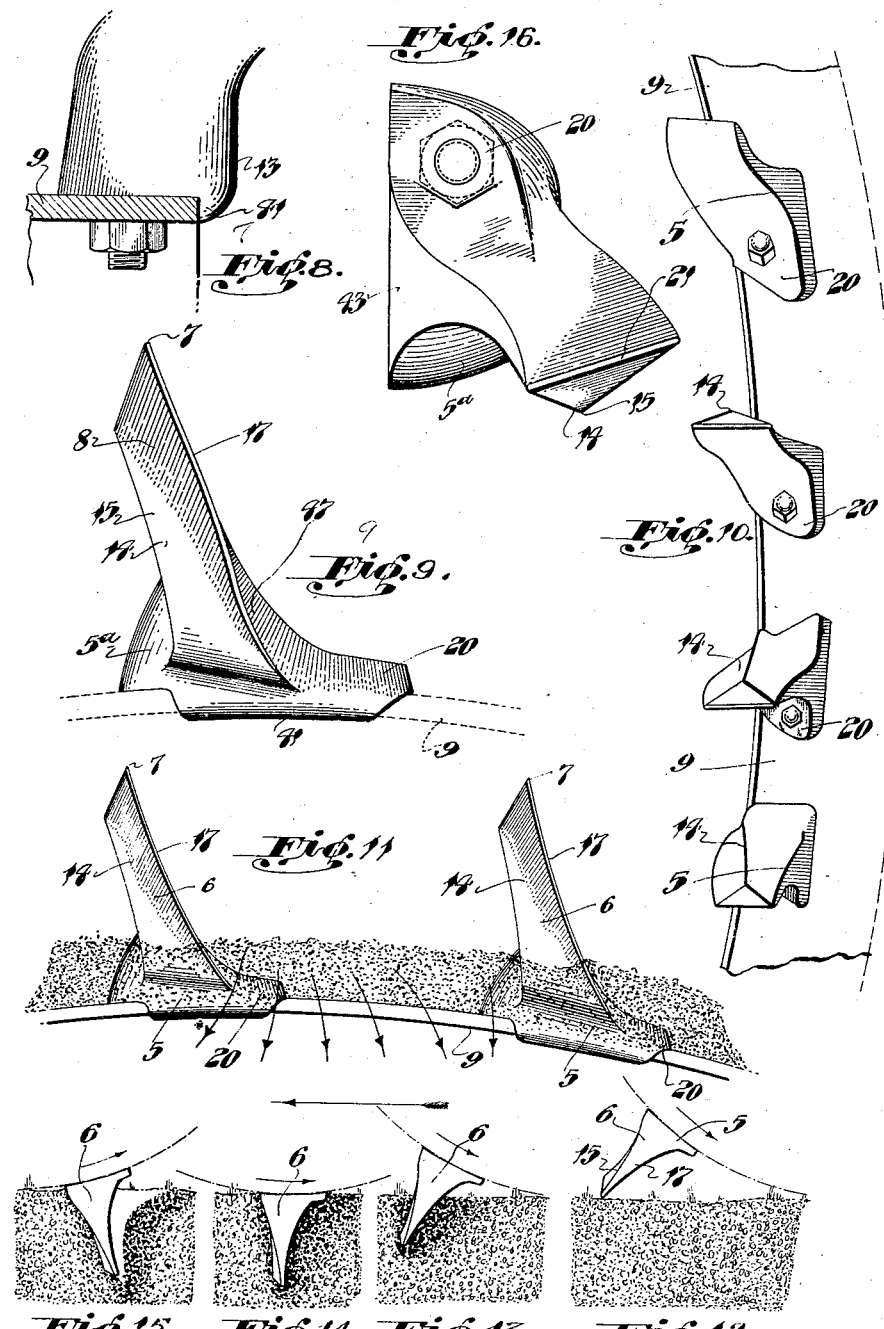

Patented Mar. 15, 1932

1,850,024

UNITED STATES PATENT OFFICE

ALEC MUNRO McGREGOR, OF PARKES, NEW SOUTH WALES, AUSTRALIA

TRACTION WHEEL LUG

Application filed August 24, 1929, Serial No. 388,170, and in Australia June 11, 1929.

This invention has reference to tractor wheel grips and is particularly directed to a grip which will provide an offset to the wheel, i. e. will increase the normal effective tread width.

Such a function is very desirable in some soils since the normal tread width is not effective where the soil is of great depth and friable and it becomes necessary, under these conditions, to not only provide means whereby the tractor will not lose ground but the wheels must have an increased normal width, thus offering greater resistance to sinking by offering a more effective area of track.

A grip as conceived in my invention comprises a member having a base and a blade with a substantial chisel edge while that portion of the blade between the base and the chisel edge has curved surfaces, the grip being provided with means for detachably affixing it to the wheel rim or tread, and being so shaped that mud accumulation is practically eliminated in that mud or earth will be deflected to the outside of the wheel when the latter is in motion. Moreover, since according to my invention the effective portions of the grip lie outside the edge of the wheel rim, no mud can accumulate between such grips when employed on a tractor wheel as there are spaces between the grips outside the wheel rim through which the mud passes.

The basic principle underlying my invention consists in the formation of a tractor grip in such a manner that an offset is provided when the grip is in position on the tractor wheel tread or rim, i. e. the contact edge portion of the grip is outside the vertical edge of the wheel, such an arrangement increasing the normal width of the rim or tread which is a very desirable feature in a tractor grip and which enables the tractor to travel any class of country from sand to heavy mud having marked adhesive qualities.

The invention is characterized by a base portion and a blade portion, said blade having a pressure face and a soil deflecting face which is inclined towards the outer edge of the wheel rim, the base portion having a heel and a bolt pocket to receive and retain a bolt head whereby the grip is detachably held to the wheel.

It will be appreciated that in sand, the penetration normally is such that little or no progress is made particularly when the tractor is under load, resulting in a large consumption of fuel for the distance travelled, further, the slippage rearwardly is such and the tendency for the wheels to bury themselves so marked, that the tractor virtually becomes inactive.

Furthermore, the advantage gained when using grips constructed according to my invention and when working in sand is due to the fact that the distance covered by the wheel when fitted with the grips is greater for the same number of revolutions of the wheel without the grips, this being brought about by the shape of the grip causing not only a lineal gain but compressing the sand in such a manner that the grip is given the maximum resistance behind it and which causes the tractor to move forwardly as each grip contacts and penetrates and functions in the manner to be described.

In order to more readily understand the invention reference will now be made to the accompanying drawings in which:—

Figure 1 is a view in perspective showing a grip constructed according to my invention.

Figure 2 is a view in elevation showing the normally forward face of the grip.

Figure 3 is a view in side elevation and partly in section showing more particularly the method of securing the grip to the wheel tread or rim.

Figure 4 is a view in plan of a grip constructed according to my invention.

Figure 5 is a view in side elevation of the grip.

Figure 6 is a fragmentary view showing more particularly the bolt hole and bolt recess.

Figure 7 is a view showing an alternative method of attaching the grip to the tractor wheel rim or tread.

Figure 8 shows the grip applied to a square edged tread.

Figure 9 shows the grip contour slightly modified.

Figure 10 shows several grips in position on a wheel tread or rim.

Figure 11 shows more particularly the maximum mud accumulation between the grips.

Figures 12, 13, 14 and 15 show diagrammatically the positions of "contact", "partial penetration", "maximum penetration" and "commencement of clearing of the grip".

Figure 16 shows an oblique contact-edged grip.

A grip formed according to my invention comprises a base member 5 and an integral blade member 6 which at its extremity has a substantial knife edge 7 termed the contact point, since this knife edge 7 is the most forwardly disposed portion of the grip and the one which makes contact and performs the necessary functions to be hereinafter explained.

The lines between the contact point 7 and the base 5 are of special character, in that they are curved to provide concave and convex surfaces, one merging into the other as is desirable.

In taking the normally forward face 8 of the grip, termed the soil deflecting face, the chisel edge 7 is substantially parallel to the wheel rim or tread 9 but the chisel edge 7 is so related to its base 5 that the chisel edge 7 is outside the vertical edge of the wheel rim 9 (see Figure 2).

The contact point 7 and the base 5 are joined by means of concave and convex lines 10 and 11 respectively with straight portions as 12 and 13 associated therewith the lines 10 and 11 of the inside and outside edges of the grip merging into the base 5 and by this development no obstruction is provided which would retard the complete penetration of the soil by the grip or offer a support for soil accumulations.

That portion of the base 5 on the normally forward face is abrupt as shown at 5a whereby no projection is presented and the withdrawal of the grip blade from the soil is facilitated.

Approximately at the centre of the grip section and on the normally forward face 8 is a rib 14, the ridge 15 of which follows substatially the lines or curves 10 and 11 of the grip contour and the said rib 14 may either be parallel with the said curved edges 10 and 11 or the rib 14 may be to one side and more tortuous than the curves defining the edges.

The contact point as has been explained is more or less knife-edged as shown more particularly in Figures 3 and 5 and the mass is removed from adjacent this point to form a chisel-shaped portion 16 which merges into the rib 14 already described.

The normally rearward face 17 of the grip is the pressure side and is concave as at 18, the concavity extending between the contact point 7 and the point 19 where it merges into the heel portion 20 of the grip which forms portion of the base 5.

In one construction, i. e. as shown in Figures 1 to 5, inclusive, the knife edge 7 is at right angles to the median plane of the wheel rim 9 but I may apply an oblique chisel edge 21 as shown in Figure 16, in which case the curves at the normally forward and rear faces 8 and 17 respectively, would be amended so as to obtain the desired continuity of line in the said curves which is highly desirable.

The heel portion 20 is preferably inclined inwardly, i. e. it is preferred to make it higher at the point 21a than at 22, while the back 23 of the heel 20 is preferably tapered inwardly as at 24 to provide maximum clearance for the soil while the heel portion 20 on its upper surface 25 is preferably ridged at 26 and tapers away inwardly in order to reduce opposition to penetration.

The underside 27 of the base 5 is curved slightly to conform to the curvature of the wheel rim 9 while raised portions 28, 29 are provided at each end of the underside of the base, thus producing a depression 30 therebetween into which the rim 9 tends to be drawn when the fixing bolts 31, 32 are tightened, and furthermore, the raised portions 28, 29 permit the grips being secured to various diameters of wheels.

The blade 7 is inclined forwardly of the heel portion 20 of the base 5 (see Figure 5) in order to obtain uniformity of pressure on the soil.

Hitherto, it has been the general practice that the fastening bolt or bolts have been cast into the grip and this is an undesirable feature, since when the bolts break off or the thread becomes stripped, the grip as a whole, becomes useless.

In order to overcome this defect, I core out a bolt pocket in the base 5 of the grip, such pocket comprising an enlarged portion 33 adapted to receive the bolt head 34 while a narrower passageway 35 connects the enlarged portion 33 and into which the bolt stem 36 slides, the head 34 of the bolt abutting against shoulders 37 provided by the narrower width of the passageway 35 in relation to the opening 33.

The heel portion 20 has an opening 38 therein through which a second bolt 39 passes, the head 40 thereof being preferably uppermost, as is the case with the bolt 36 in the pocket described.

The base may be flat or slightly curved in cross section and is provided with an integral flange 41 which is adapted to abut against the side 42 of the wheel rim 9, which arrangement adds to the rigidity of the grip where fitted and it will be understood that the flange 41 will be shaped to fit the rim edge whether square, round or angular.

The inside portion of the base 5 rises substantially vertical for a short distance as at 43 when it curves convexly as at 44 to join the curve 10 constituting the inner edge of the grip and the object of this vertical portion 43 is to allow a scraper being employed between the opposed grips, (since grips are disposed on each edge of the rim 9) in order to remove the accumulated soil from the wheel tread 9 and between the grips. Thus the only portion on which soil might accumulate is that portion existing between the inside edge of the grip as at 13 and a vertical line A—A taken in line with the edges 42 of the wheel rim 9, the effective portion of the grip remaining clean and providing the necessary functions under all working conditions.

There is no obstruction between the offset portion of the grip and the vertical edge 42 of the wheel and since this is so no earth can accumulate for the reason that any temporary adherence is removed by the oncoming mass which keeps forcing any temporary accumulation clear and towards the outside of the rim 9, thus the grip is self-cleaning.

In operation the grip is secured to the wheel tread 9 by means of the bolts 31 and 32 already described and when the said bolts 31 and 32 are tightened, the grip becomes rigidly affixed to the wheel rim 9 and any displacement is prevented by the bolts 31, 32 tending to draw the wheel rim 9 into the depression 30 formed on the underside 27 of the base 5 and in addition thereto, the depending flange 41 of the grip abutting against the edge 42 of the wheel rim 9 adds to the rigidity and stability of the grip.

The curvature of the side or edges of the grip which have been already described, causes the contact point 7 of the said grip to take a position outside the vertical edge 42 of the wheel rim 9 and as already explained, this contact point 7 is of knife edge form and may be at right angles to the wheel rim or it may be obliquely disposed thereto without departing from the spirit and scope of the invention.

The grips are normally disposed on the inside and outside edges of the wheel rim 9 and they are in relatively staggered positions but it will be understood that I may only employ a line of grips on the inside or outside of the wheel rim 9.

Instead of bolting the grips to the tread surface I may form an integral lug 45 on the grip as shown in Figure 7, in which case the grip will be secured to the inside of the tread 9 and if necessary the lug 45 may be provided with an integral rib or ribs 46 to increase the normal strength and in this construction it is preferred to use countersunk bolts leaving the entire surface of the rim or tread 9 free from obstruction and upon which a scraper may operate to maintain the rim absolutely free from mud.

Furthermore, I may cut away a portion of the blade 6 as at 47 so as to obtain the greatest possible distance between the blades.

The grip on contacting with the soil and during the initial penetration slides forwardly, see Figures 12 and 13, due to the particular curvature of the rear face 17 of the grip blade 6.

What I claim as my invention and desire to secure by Letters Patent is:—

A tractor wheel grip comprising a base portion and an integral offset blade portion, said blade having a concave pressure face and a ribbed forward face and a chisel edge to the blade portion, the surfaces of the forward face of said blade portion connecting the chisel edge with the base being substantially concave and convex curves.

Signed at Melbourne, Victoria, Australia, this 5th day of July, A. D. 1929.

ALEC MUNRO McGREGOR.